W. HAAG.
DRAFT APPLIANCE.
APPLICATION FILED SEPT. 26, 1911. RENEWED OCT. 9, 1912.
1,044,883.
Patented Nov. 19, 1912.
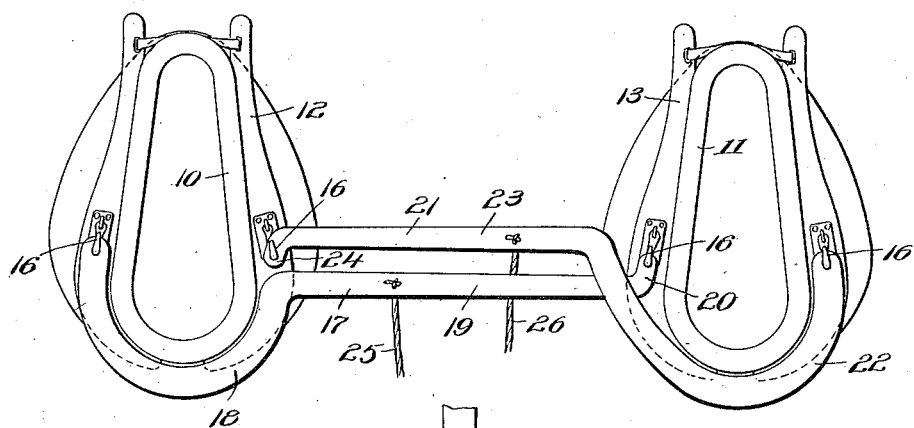
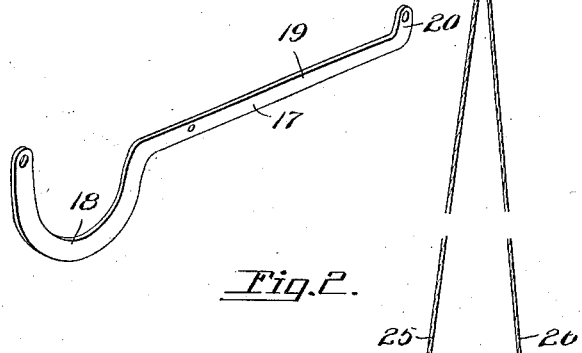
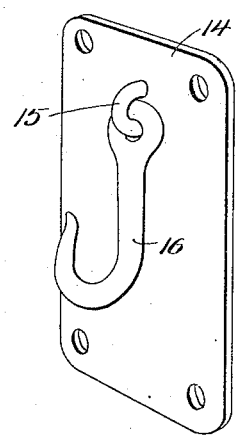
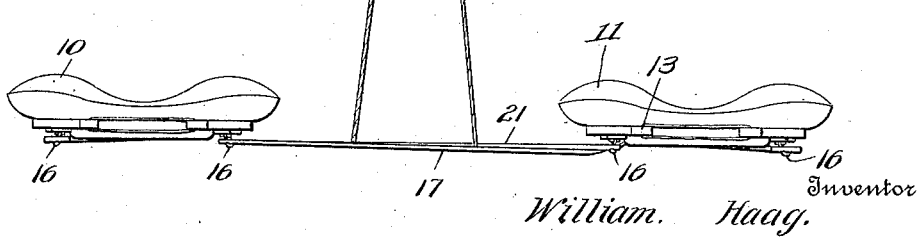
William Haag,
Inventor
Witnesses
F. C. Gibson
F. H. Hoster
By Victor J. Evans
Attorney

UNITED STATES PATENT OFFICE.

WILLIAM HAAG, OF PEMBROKE, VIRGINIA.

DRAFT APPLIANCE.

1,044,883. Specification of Letters Patent. Patented Nov. 19, 1912.

Application filed September 26, 1911, Serial No. 651,386. Renewed October 9, 1912. Serial No. 724,821.

*To all whom it may concern:*

Be it known that I, WILLIAM HAAG, a citizen of the United States, residing at Pembroke, in the county of Giles and State of Virginia, have invented new and useful Improvements in Draft Appliances, of which the following is a specification.

An object of the invention is to provide a draft appliance, particularly adaptable for use in connection with plows drawn by draft animals, to enable the draft animals to convey the plow over the ground without injuring or disfiguring trees and shrubs, adjacent the path of the plow.

My invention relates more particularly to a device adapted to take the place of the trace and swingletree of plow harness, now generally used for the purpose of plowing orchards.

In plowing the orchard it is practically impossible to plow close to the trees, with the ordinary trace chain and swingletree, without injuring or mutilating the trees, which in time die. To overcome this deficiency I provide a device which does away with the ordinary trace chain and swingletree and the plowman can drive his team close to the trees without injuring the same.

To accomplish the desired result, use is made of draft bars having the ends thereof mounted on hooks, swingingly mounted on the hames, forming a part of the harness of a team of draft animals, one of the bars having an end thereof mounted on the left side of one of the hames with the other end of the bar mounted on the left side of the other hame, the other bar having an end thereof mounted on the right side of the one hame with the other end thereof mounted on the right side of the other hame, suitable straps being secured to the medial portions of the said bars and extending rearwardly therefrom, for connection with a plow.

Reference is to be had to the accompanying drawings, constituting a part of this specification, in which similar characters of reference denote corresponding parts in all the views, and in which—

Figure 1 is a front elevation showing my device applied. Fig. 2 is a plan view. Fig. 3 is a perspective view of one of the bars. Fig. 4 is a perspective view of one of the hooks.

Referring more particularly to the views, I provide collars 10, 11 having hames 12, 13 mounted thereon, in the usual manner and secured to the hames 12, 13 are plates 14, provided with staples 15 on which are mounted to swing suitable hooks 16. A draft bar 17, provided with a curved portion 18, a shaft 19 and an offset portion 20, is mounted on the hames 12, 13 with the curved portion 18 extending around the lower end of the collar 10, the extremity of the curved portion being provided with an opening adapted to receive one of the hooks 16 therethrough, the offset portion 20 of the draft bar being provided with an opening adapted to receive one of the hooks 16, mounted on the hame 13, the shank 19, arranged between the collars 10 and 11 being substantially horizontal.

A second draft bar 21, provided with a curved portion 22, a shank 23 and an offset portion 24 is mounted with the curved portion 22 extending around the lower end of the collar 11, the extremity of the said curved portion being provided with an opening adapted to receive one of the hooks 16 therethrough, the offset portion 24 of the draft bar 21 being provided with an opening in which is received another of the hooks 16, mounted on the hame 12. The draft bars 17 and 21 are similar in shape and when applied to the hames 12, 13 are simply reversed in the order of their arrangement, as shown in Fig. 1.

At the medial portions of the draft bars 17 and 21, straps 25, 26 respectively, are secured and extend rearwardly for connection with the clevis 27 of a plow 28. The hooks 16, to which the draft bars 17, 21 are connected, are dependingly mounted on the staples 15, thus constituting pendulum hooks, capable of swinging relatively to the staples, thus permitting a swinging movement of the bars 17, 21 and enabling the same to adjust themselves in accordance with the particular position of the horses, having the hames mounted thereon. By providing the straps 25, 26 to extend rearwardly between the horses, the usual trace chains and swingletrees being abolished so that the young trees of an orchard will not be disfigured by the same, it will be readily seen that with my device the horses can be driven very close to the trees without fear of barking the same, while in the use of trace chains and swingletrees, the trace chains striking the trees would tear the bark therefrom and otherwise mutilate the trees so that the same would in time be destroyed.

I claim:—

1. In a draft appliance, a plurality of draft bars, each provided with a curved portion, a shank and an offset portion, means for pivotally connecting the said curved portions and said offset portions with the harness to insure a vertical swinging movement and a forward and backward swinging movement of the draft bars, and straps secured to the shanks of the said draft bars and extending rearwardly therefrom for connection with an agricultural implement.

2. In a draft appliance, a plurality of draft bars, each consisting of a curved portion, a shank and an offset portion, means for connecting the curved portions and offset portions to a harness to insure a vertical swinging movement and a forward and backward swinging movement of the draft bars, and straps extending rearwardly from the shanks of the said draft bars.

3. In a draft appliance for connection with a harness, hooks mounted on the said harness, and a plurality of draft bars, each consisting of a curved portion, a shank and an offset portion, the curved portions and offset portions of the said draft bars being provided with openings for pivotally connecting the same to the hooks, to insure a vertical swinging movement and a forward and backward swinging movement of the draft bars.

In testimony whereof I affix my signature in presence of two witnesses.

WILLIAM HAAG.

Witnesses:
F. A. HOSTER,
BENNETT S. JONES.

---

Copies of this patent may be obtained for five cents each, by addressing the "Commissioner of Patents, Washington, D. C."